(12) United States Patent
Ravichandran et al.

(10) Patent No.: US 8,494,477 B2
(45) Date of Patent: Jul. 23, 2013

(54) POWER MANAGEMENT FOR AN ELECTRONIC DEVICE

(75) Inventors: Krishnan Ravichandran, Saratoga, CA (US); Harish Krishnamurthy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 13/168,492

(22) Filed: Jun. 24, 2011

(65) Prior Publication Data

US 2012/0329509 A1 Dec. 27, 2012

(51) Int. Cl.
*H04B 1/16* (2006.01)

(52) U.S. Cl.
USPC .............. 455/343.1; 455/343.2; 455/127.1; 455/127.5; 455/522

(58) Field of Classification Search
USPC ............ 455/343.1–343.6, 127.1, 127.5, 574, 455/522, 69, 298
See application file for complete search history.

(56) References Cited

U.S. PATENT DOCUMENTS

| | | | | |
|---|---|---|---|---|
| 4,476,437 A * | 10/1984 | Fujiwara | | 330/138 |
| 7,203,470 B2 * | 4/2007 | Seo | | 455/139 |
| 8,400,380 B2 * | 3/2013 | Lee | | 345/77 |
| 2003/0158609 A1 | 8/2003 | Chiu | | |
| 2005/0046400 A1 | 3/2005 | Rotem | | |
| 2005/0215227 A1 * | 9/2005 | Vu et al. | | 455/343.2 |
| 2008/0091965 A1 | 4/2008 | Nychka et al. | | |
| 2009/0201082 A1 | 8/2009 | Smith et al. | | |
| 2009/0265565 A1 * | 10/2009 | Suurballe | | 713/300 |
| 2010/0201198 A1 * | 8/2010 | Chang | | 307/80 |
| 2012/0077447 A1 * | 3/2012 | Rofougaran | | 455/73 |
| 2012/0094611 A1 * | 4/2012 | Rofougaran | | 455/69 |
| 2012/0329411 A1 * | 12/2012 | Chan et al. | | 455/127.1 |
| 2013/0051440 A1 * | 2/2013 | Rofougaran | | 375/219 |

OTHER PUBLICATIONS

International Search Report and Written Opinion dated Dec. 20, 2012 for PCT/US2012/043527.

* cited by examiner

*Primary Examiner* — Dominic E Rego
(74) *Attorney, Agent, or Firm* — KED & Associates, LLP

(57) ABSTRACT

A control device includes a selector and a controller. The selector is to select power signals to be supplied to respective power domains of an electronic product. The controller is to compare a level of a first power signal selected by the selector to a first target level, and to generate a first setting signal to reduce a difference between the first power signal level and the first target level. The controller, selector, and power domains may be located on a same chip different from a power manager chip from which the power signals are generated or otherwise output.

22 Claims, 7 Drawing Sheets

POWER MANAGEMENT FOR AN ELECTRONIC DEVICE

FIELD

One or more embodiments described herein relate to power management.

BACKGROUND

The electronics industry requires manufacturers to offer small-sized consumer products. To meet this demand, the computing platforms of these products must be highly integrated, which requires greater functionality to be designed into the power supply and control chips.

Because of their complexity, different segments of the computing platforms require different voltage rail and current levels. These different levels have been provided using discrete voltage regulators which are specifically fixed in terms of their performance, e.g., number of rails, rail voltages, maximum rail current as well as other factors. The requirement of having to produce different voltage regulators, or regulator arrays, for each kind of electronic product has proven inefficient and expensive to say the least.

DETAILED DESCRIPTION

Figure 1:
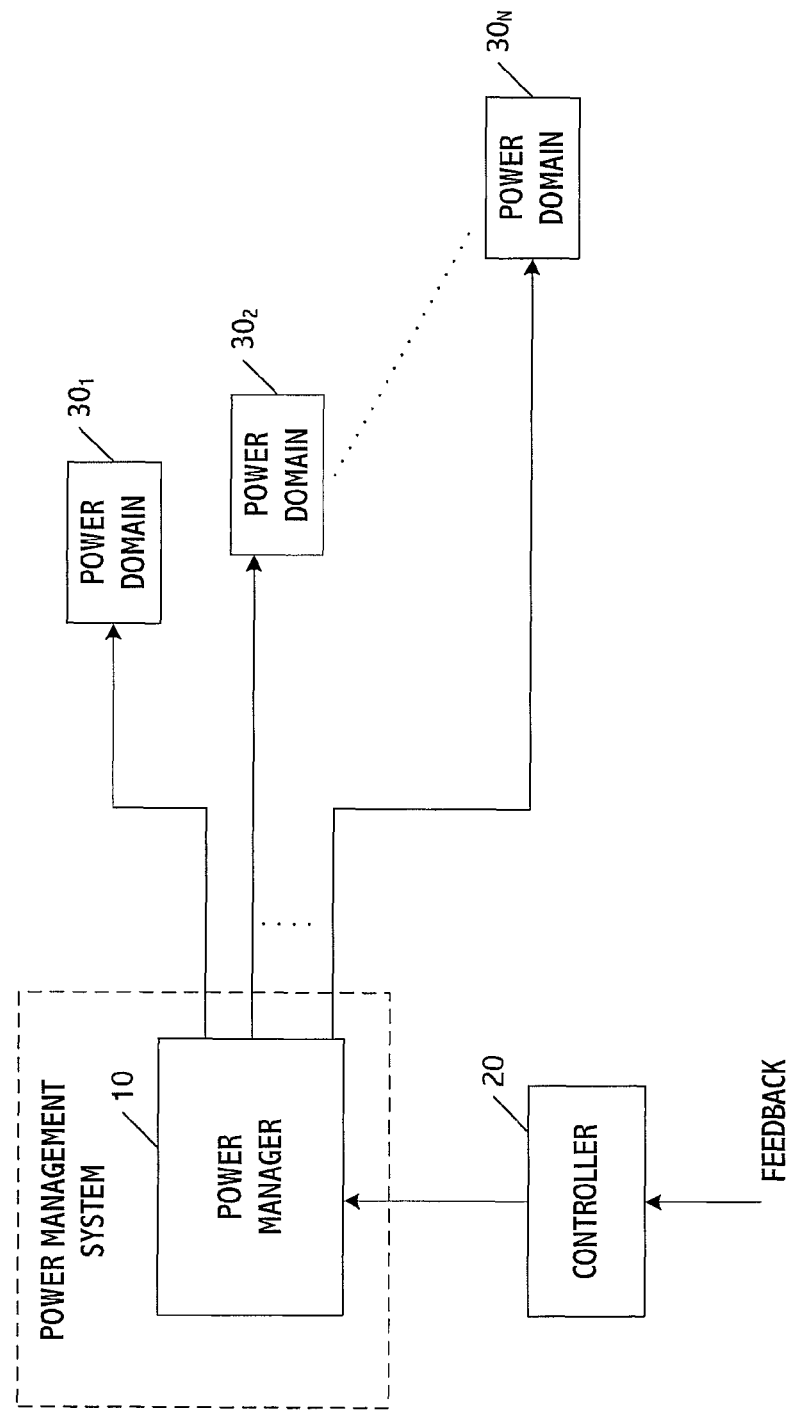
FIG. 1 shows one embodiment of a power management system.

FIG. 1 shows one embodiment of a power management system which may be used in an electronic product, such as a smart phone, computer tablet, personal digital assistant, netbook, electronic book, mobile phone or other type of terminal, global positioning system, electronic camera, media player, or other type of electronic device.

The power management system includes a power manager 10 and a controller 20. The number of rails from the power manager may be configured on the board shown by the dotted lines in FIG. 6 and FIG. 7, but the voltage level of each rail may be programmed by the controller to supply different kinds of voltages to respective ones of a plurality of power domains $30_1, 30_2, \ldots 30_n$ in the product. The power domains may correspond to different functions, circuits, or segments. For example, in the case where the product is a smart phone, one power domain may correspond to a display unit or other output device, another domain may correspond to a processor, another domain a media player, and so on, all of which may have different power requirements.

Additionally, or alternatively, the power domains may correspond to functions or circuits of the host product that operate at different times and/or under different conditions. Some power domains, for example, may only operate at power-up or shutdown. Others may operate on a continual basis. The circuits or functions that belong to a same power domain may not be centrally located within the product but rather may be at different locations. They may all share, however, common power requirements and therefore may all be driven by a power signal from a same power or current rail.

The power manager may be equipped with a plurality of voltage regulators that can be independently and selectively enabled by controller 20 to output the different kinds of power to respective ones of the power domains. The voltage regulators are also selectively and independently reconfigurable and/or combinable by the controller, in order to allow a single chip containing the power management system to be manufactured for a variety of products having different operating characteristics. Using this system, the manufacturer would only have to produce, for example, one chip for multiple products, thereby alleviating the need to develop chips with fixed configurations specific to each product. This may result in an increase in the efficiency and production of the chips at substantially less cost.

In accordance with one embodiment, the voltage regulators may be included in different power stages or slices. For example, as shown, the power stages or slices may include a plurality of drivers and field effect transistors (FETs) that can be independently and selectively enabled by controller 20. The driver and FET slices may provide a certain amount of current that can be supplied. According to one example, the greater the number of slices, the greater the current capability. Various combinations of driver inputs may be coupled, as well as various combinations of FET outputs if more current is to be supplied to a given voltage domain, as will be explained in greater detail. Also, the voltage level of each rail may be selectively and independently reconfigurable by the controller, in order to allow a single chip containing the power management system to be manufactured for a variety of products having different operating characteristics.

While the controller 20 is shown as being part of the power management system, in other embodiments the power manager may exist separately on a single chip and the controller may be located off-chip, for example, at another location on a mother board or section of the product. Alternatively, the controller may only be coupled to the power manager at manufacture, so that the manager may be configured to meet the requirements of a specific product, and then removed. The controller may adjust the power manager based on pre-stored information and/or based on feedback from the power rails as will be described in greater detail.

Figure 2:
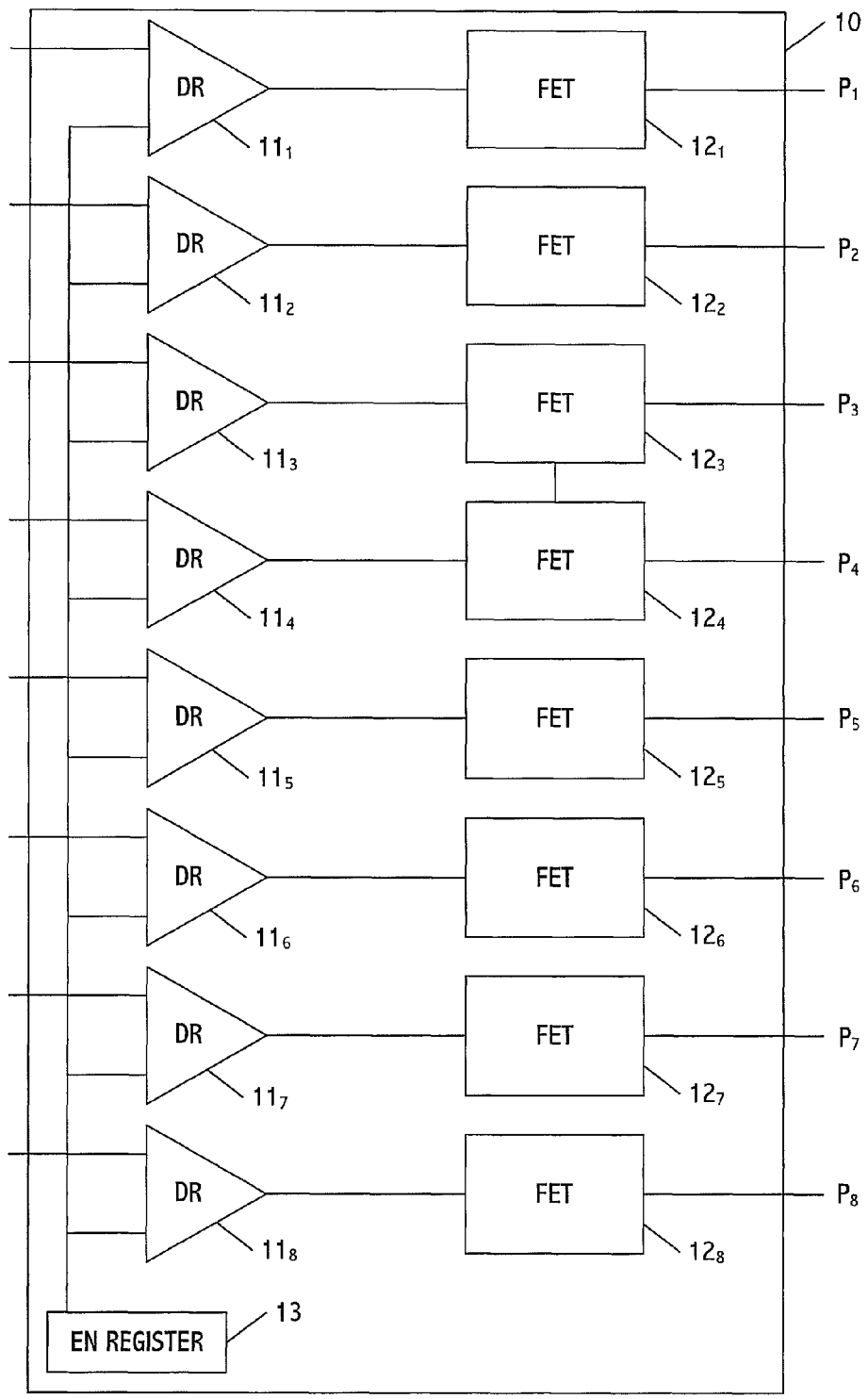
FIG. 2 shows one possible structure of the reconfigurable power manager.

FIG. 2 shows an example of one possible structure of the reconfigurable power manager 10. This structure includes an array of drivers (DRs) $11_1 \ldots 11_8$ coupled to respective ones of a plurality of control circuits (e.g., FETs) $12_1 \ldots 12_8$, and a control register 13. This register may be or include, for example, an enable/disable register. The power manager may be formed on a single chip, where the inputs into the drivers and the outputs of the control circuits are coupled to separate nodes of the chip. These nodes may be, for example, pins, solder bumps, leads, or any other point or path cable of carrying a signal to, from, or between the chip and an external circuit. Of course the power manager may be differently configured in other embodiments.

In this example, corresponding pairs of the driver and control circuits may form a power stage of a predetermined type, e.g., a buck-type DC-DC voltage converter. Also, each driver circuit may be selectively and independently enabled by enable signals output from control register 13. The enable signals may be sent to the drivers using a predetermined bus protocol, such as but not limited to the serial peripheral interface (SPI) protocol or the inter-integrated circuit (I2C) protocol.

Depending on the requirements of the power domains, only one driver circuit may be enabled at any given time. Alternatively, all or a subset of driver circuits may be enabled to output different kinds of power consonant with the requirements of the power domains.

Also, each power stage may provide a separate power output or the power outputs of multiple stages may be combined. Such a case may occur, for example, when the maximum power level of any given power stage is less than the power to be supplied to a particular domain. By aggregating the outputs of multiple power stages, the domain requirements may be met.

Each control circuit 12 may include a transistor which operates to power the load requirements of one or more associated domains. The control circuits (e.g., FETs) translate the logic domain (setting) signals of the controller to power outputs with the help of the driver circuits. Thus, for example, the power manager may operate as a power amplifier for the logic signals provided by the controller.

The output of the power stages (power signals $P_1 \ldots P_8$) may correspond, for example, to predetermined different kinds of power or power levels. These types of power may include, for example, a specific supply or rail voltage (Vcc) or voltage range, a specific maximum current per rail, or both. In one embodiment, the power signals may be varying levels ranging from full power, to lower power, to sleep mode, and/or other mode-level power. In other embodiments, the supply or rail voltages may be different but each power stage output may have a same maximum current or current-carrying capacity. In a smart phone application, current may be 500 mA.

In accordance with a particular example, the outputs of the power stages (power signals $P_1 \ldots P_8$) may correspond to predetermined voltage levels determined by corresponding input voltages. The outputs ($P_1 \ldots P_8$) may be switching waveforms with variable duty cycles determined by corresponding ones of the setting signals from the controller. The setting signals may be pulse width modulated (PWM) signals.

Figure 3:
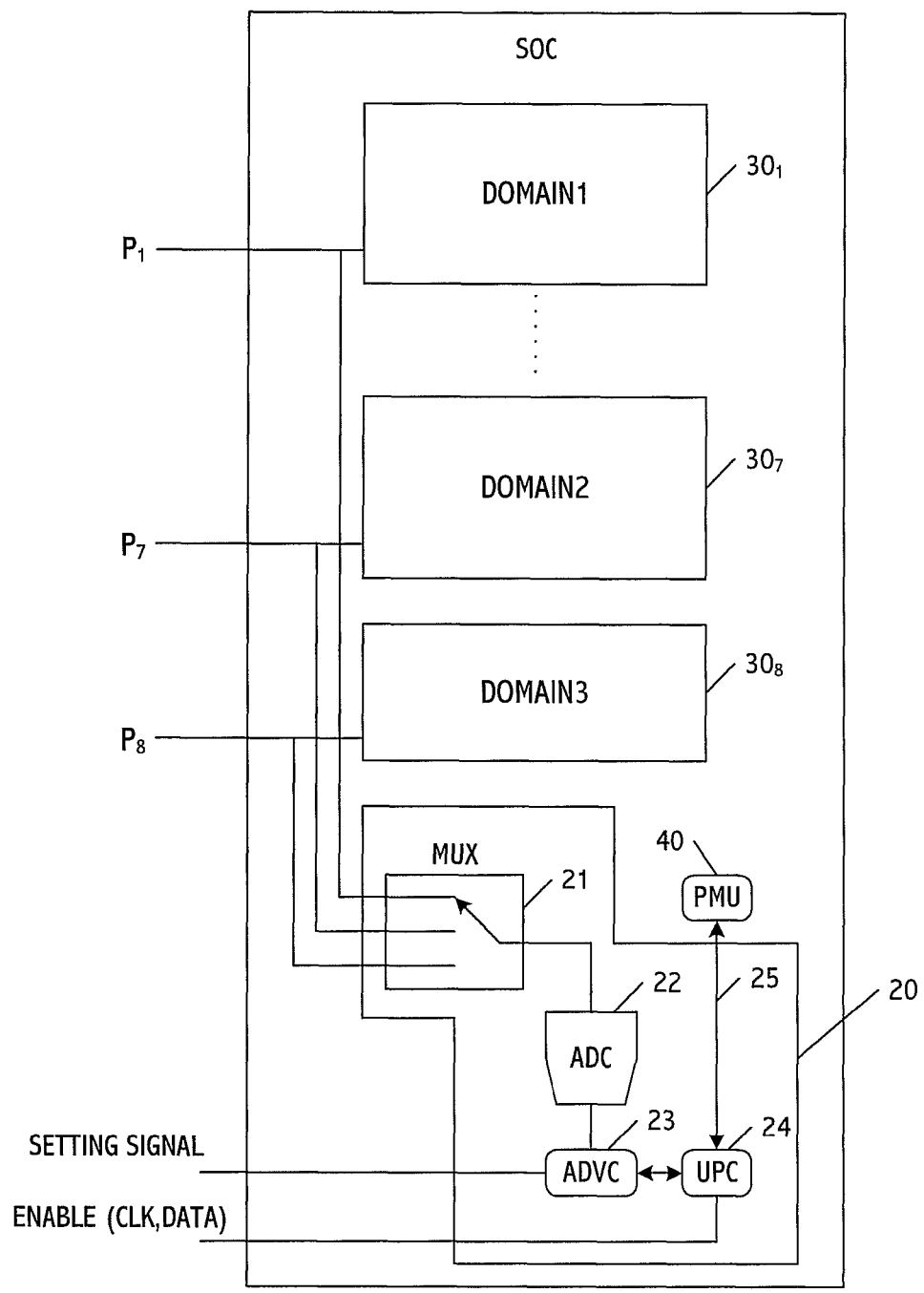
FIG. 3 shows one possible structure for the controller and power domains.

FIG. 3 shows one possible structure of controller 20 and the power domains. According to this structure, the controller 20 is not located on the same chip on which the power manager is located, but is coupled to receive the power signals from that chip. (As indicated, in other embodiments, the controller may be located on the same chip as the power manager.) Also, according to one embodiment, the power domains and controller may be included on a same chip (e.g., system-on-chip (SOC)) having pins or leads to receive corresponds ones of the power signals output from the power manager, and additional pins coupled to inputs of the manager.

Figure 4:
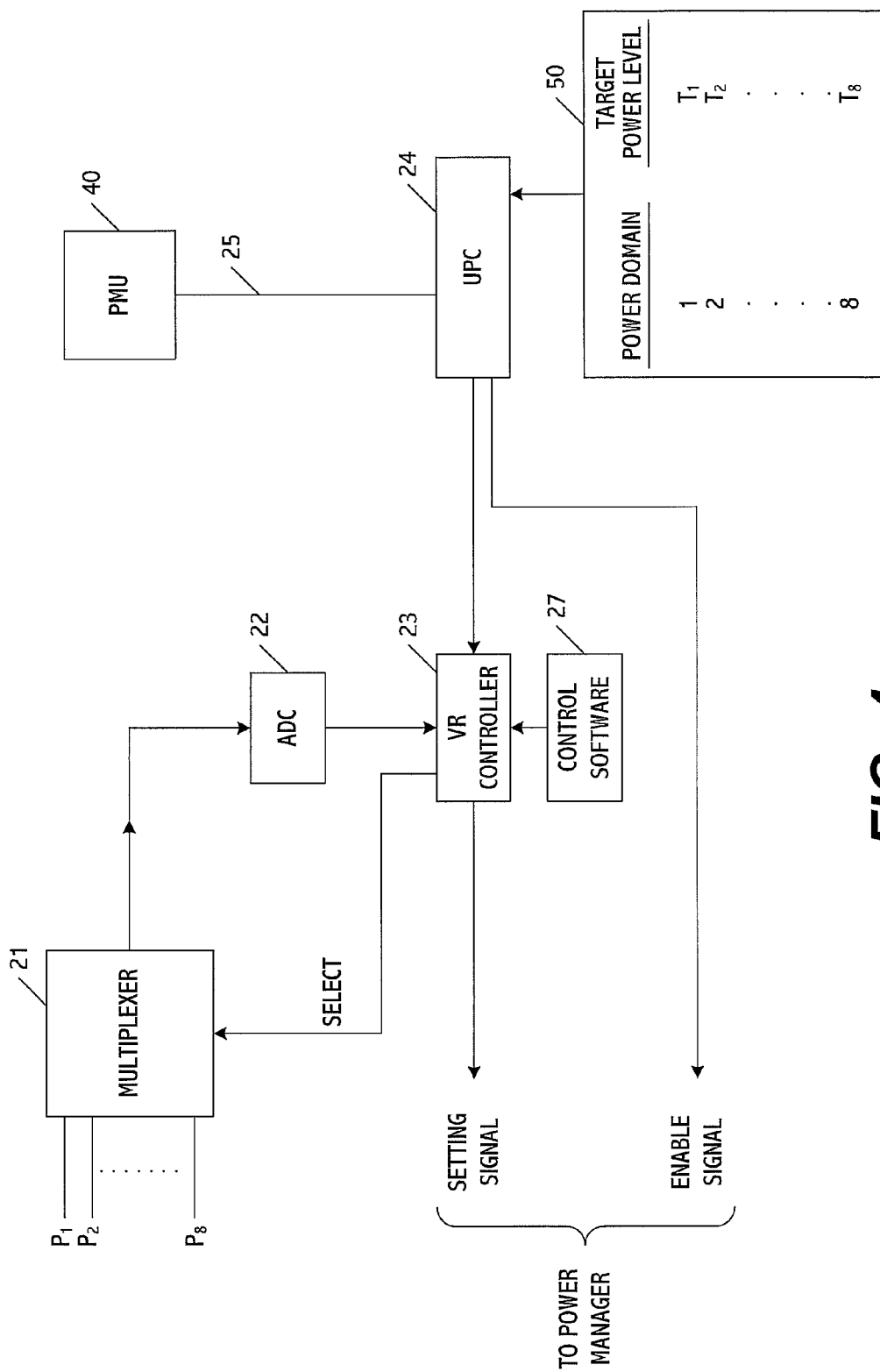
FIG. 4 shows a more specific example of the controller.

Irrespective of its on- or off-chip location, controller 20 may include a multiplexer 21, an analog-to-digital converter 22, an advanced digital voltage regulator (VR) controller (ADVC) 23, a unified power controller (UPC) 24, and an interface 25 between the UPC and an off-chip power management unit (PMU). FIG. 4 shows a more specific implementation of the controller.

In accordance with one embodiment, the PMU and UPC manage the power states within the system-on-chip (SoC) and are capable of indicating the power state of the entire platform for the electronic product, e.g., phone. This information is then translated into appropriate voltage levels to be communicated to the VR controller. The maximum power for a particular state is stored in the UPC block, and this information is used to determine the most efficient operating state of the power manager to improve overall platform efficiency. According to one particular example, the PMU & UPC may determine the levels of various rails by programming corresponding control register in or coupled to controller 12.

Referring to FIGS. 3 and 4, the multiplexer 21 is coupled to receive respective ones of the power signals $P_1 \ldots P_8$ output from the power manager. In operation, the multiplexer receives a signal to select each input. The select signal may be generated, for example, by VR controller 23, and the power signals may be selected sequentially or based on a predetermined schedule specified by, for example, control software. This software may be resident on the chip that includes the power domains and/or controller 20, or in a memory 27 internal or coupled to, for example, the PMU, a processor chip, or the VR controller. For illustrative purposes, memory 27 is shown as being coupled to the VR controller.

Figure 5:
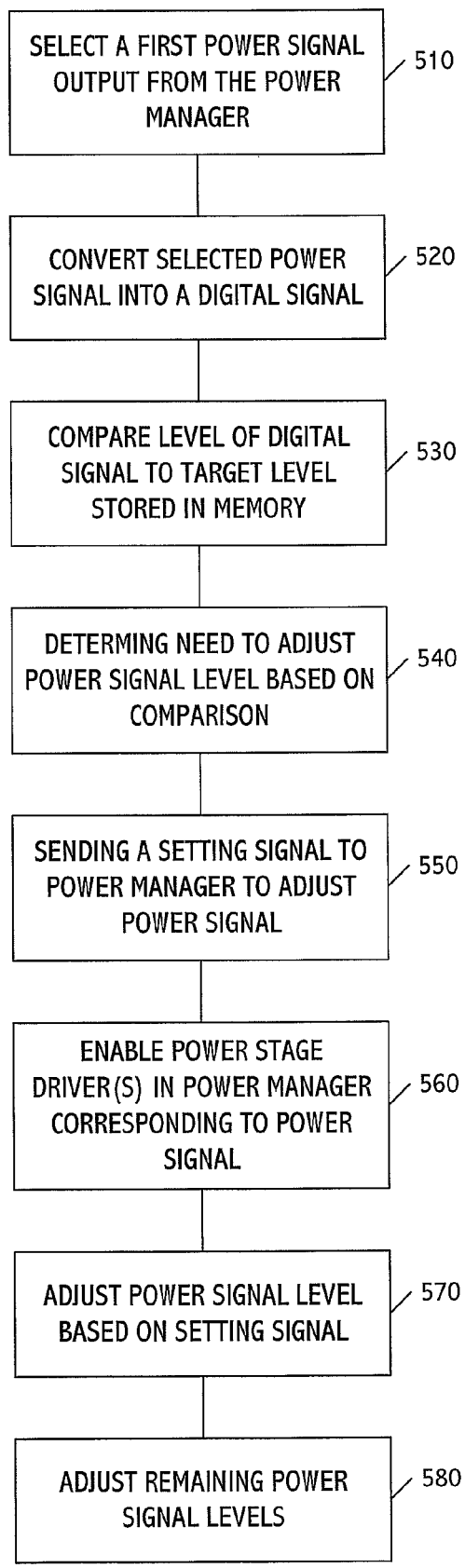
FIG. 5 shows operations included in a power control method.

By way of example and with reference to the flow chart of FIG. 5, a first input $P_1$ into the multiplexer is selected based, for example, on the control software in memory 27. (Block 510). When the first input is selected, power signal $P_1$ is converted into a digital signal (or word) by converter 22. (Block 520). The digital signal may be indicative of the level of the power signal in terms of, for example, voltage or current.

The digital signal is then input into VR controller 23, which includes a comparator that compares the digital level indicated by the signal to a predetermined target or reference (voltage identification (ID)) level $T_1$. (Block 530). The target level may be pre-stored in a memory 50 and provided to the VR controller through UPC 24. This level is set to define the level of power signal $P_1$ that matches the power requirements of the first power domain $30_1$.

Based on the comparison performed by the VR controller, a determination is made as to whether the level of power signal $P_1$ as output from the power manager needs to be adjusted. (Block 540). For example, if the level of power signal $P_1$ deviates at all or by a predetermined amount from target level $T_1$, the VR controller may determine that the level of the power signal requires adjusting, in order to reduce the deviation and thus to better match the power requirements of the first power domain.

When a deviation is determined to exist, the VR controller sends a setting signal to the power manager to adjust the power signal for the first power domain. (Block 550). The setting signal may include a predetermined number of bits of digital information, to be used in making the adjustment. An example of such a signal is a pulse-width modulated (PWM) signal, although different types of signals may be used in other embodiments.

Before or while the setting signal is sent, an enable signal may be sent to the power manager. (Block 560). The enable signal may be sent, for example, from the VR controller or UPC in order to enable the driver circuit(s) for generating the adjusted power domain signal. (For illustrative purposes, the UPC is shown as generating the enable signal). The enable signal may be stored in the enable register or may be input into the driver circuit(s) independently from or without using the enable register.

The UPC may also increase the efficiency of the power manager by performing phase shedding or area scaling, or both, by controlling the number of bits assigned to each power signal rail. For example, the UPC may receive power state information of a particular rail in question and determine the maximum current requirement for that operating state. If each power stage or slice is rated for 500 mA and the operating state is C6 (e.g., one of a plurality of operating states of Intel or other types of processors) and the rail is entering a standby state, it may be determined by the UPC that a single slice is sufficient to deliver the current requirements of that rail. All other slices coupled to other rails or which form a part of the same rail may be disabled to enable highest efficiency.

While entering such a power state the lowest voltage required may also be determined and the voltage identification (VID) may be commanded to the VR controller to modify the voltage required to maintain the required state. In this example, during a C6 state, the output voltage is also lowered to reduce the leakage power consumed by the voltage domain. This is done through the control registers of the ADVC and is determined by the UPC. Once the relevant driver circuit(s) have been enabled, the drivers adjust their power level output based on the setting signal, input voltage, as previously explained. (Block 570).

After power signal $P_1$ has been adjusted, the control software in memory 27 may output a signal to the multiplexer to select subsequent ones of the power signals. Additionally, or alternatively, the VR controller and UPC may cooperate in a manner analogous to the adjustments made to power signal $P_1$ to adjust the power signals for remaining ones of the power domains. This may be accomplished in accordance with the target levels pre-stored in memory 50 for the other power domains. (Block 580). At the end of these operations, the power manager 10 is configured to generate power for each of the domains.

Moreover, by setting or changing the target levels of the power signals stored in memory 50, the power manager may be initially configured by the manufacturer, or reconfigured by the manufacturer or a technician in the field, to automatically satisfy the requirements of the power domains of different electronic products that function according to different operating characteristics. This, in turn, allows the same power manager chip to be manufactured and used for different products, in spite of their different operating characteristics.

In accordance with at least one embodiment, the voltage for powering the VR controller, UPC, multiplexer, analog-to-digital converter, and power management unit may be supplied from a separate rail, not associated with the power manager. This may be accomplished, for example, using a simple low drop out (LDO) regulator mounted on a host printed circuit board connected to a battery.

Figure 6:
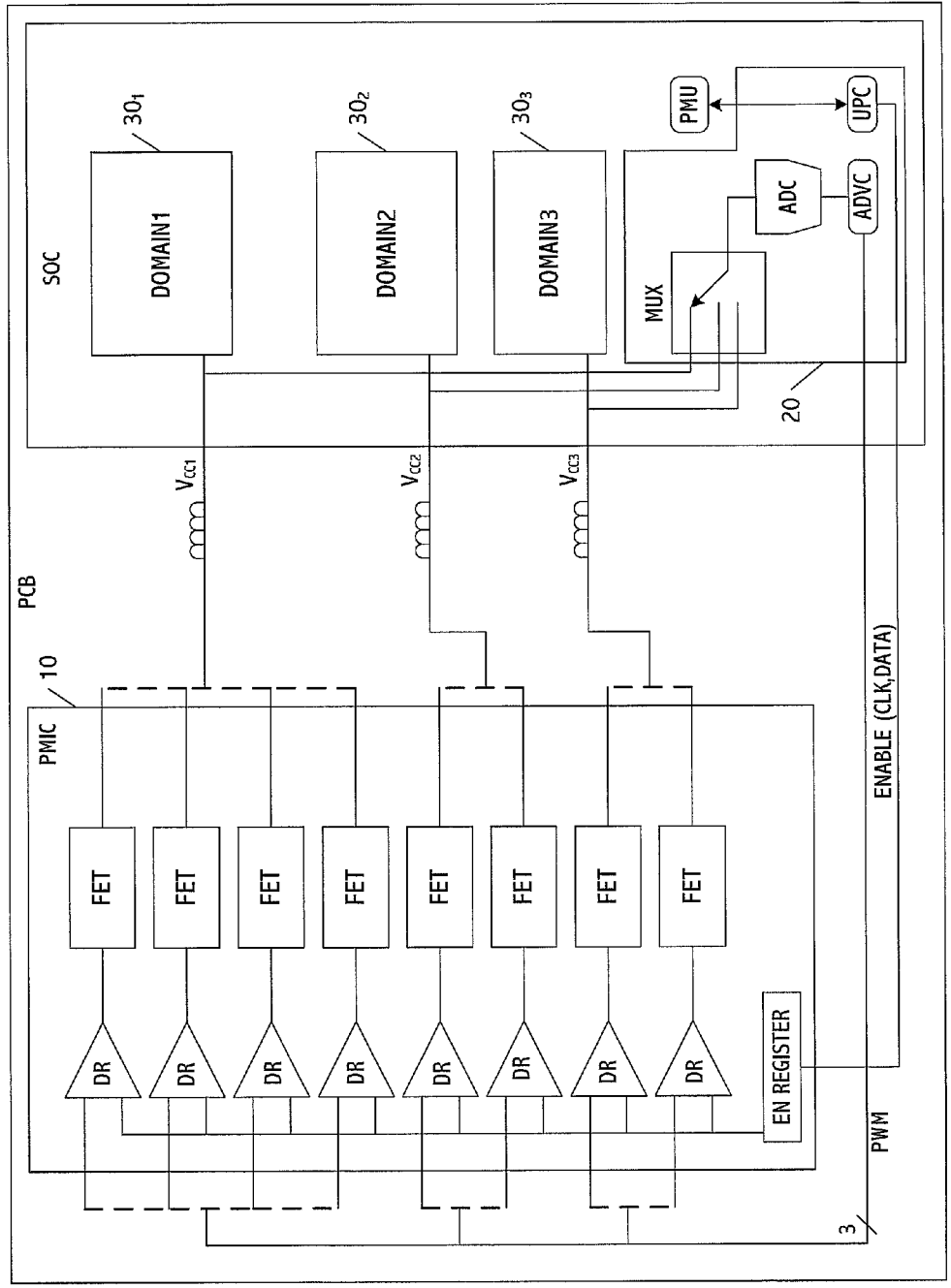
FIG. 6 shows another structure for the reconfigurable power manager.

FIG. 6 shows another embodiment of the reconfigurable power manager. This embodiment is similar to the previous embodiment, except that at least one power signal is generated based on power signals output from a plurality of power stages. For example, a first power signal (Vcc1) is generated by combining the power signals output from the first four power stages. These outputs may be coupled, for example, to an inductor, which is coupled to the Vcc1 rail or input of the first power domain, or the chip including this first domain.

A second power signal (Vcc2) is generated by combining the power signals output from the fifth and sixth power stages. And, a third power signal (Vcc3) is generated by combining the power signals output from the seventh and eighth power stages. The number of power stages, or slices, that are combined in each output rail may depend, for example, upon the current requirements of each respective rail. For example, if each slice is capable of handling 500 mA, then in the embodiment of FIG. 6 the rails carrying power signals Vcc1, Vcc2, and Vcc3 may require a maximum current Icc of 2 amps, 1 amp, and 1 amp respectively.

The VR controller generates setting signals for input into the driver circuits of the power stages corresponding to each of the power domain signals. According to one embodiment, the same setting signal may be input into, for example, the first through fourth drivers. This may be accomplished, for example, by coupling together the input pins of the first through fourth drivers of the power manager chip to receive this setting signal. A different setting signal may be input into the fifth and sixths drivers (with corresponding input pins coupled), and yet another setting signal may be input into the seventh and eighth drivers (with corresponding input pins coupled).

As a result of this configuration, the first through fourth drivers will output the same power level, the fifth and sixth drivers the same power level, and the seventh and eight drivers the same power level.

In another embodiment, the VR controller outputs different setting signals to the drivers used to generate Vcc1. This could be true for a multi-phase application in which case the four phases requires different setting signals. Additionally, or alternatively, at least two of the first through fourth drivers may output power signals at different levels in order to achieve the intended level, Vcc1, for the first power domain. The same may be true of the other drivers, or the other drivers may receive the same respective setting signals to cause these drivers to output the same respective power levels. As previously indicated, the setting signal shown in FIG. 6 may be a PWM signal or another type of signal capable of conveying digital or other information.

In addition to these features, the first through fourth drivers may be enabled at the same time based on, for example, enable signals in the enable register or from the UPC. The same may be true for enabling the fifth and sixth drivers and for enabling the seventh and eighth drivers. The enable and setting signals are shown to be sequentially transmitted. However, in different embodiments, the enable signals and/or setting signals may be generated and sent in parallel so as to set or adjust the power signals for all or a portion of the drivers simultaneously, or may be sent over direct wire, with the enable for each power stage being directly driven by the outputs of SOC pins.

Also, in FIG. 6, the power manager 10, controller 20, and power domains 30 may all be formed on a same printed circuit board (PCB). The power manager may be embodied on one chip with input and output leads coupled as shown, and the power domains may be formed on a system-on-chip with or without controller 20.

Figure 7:
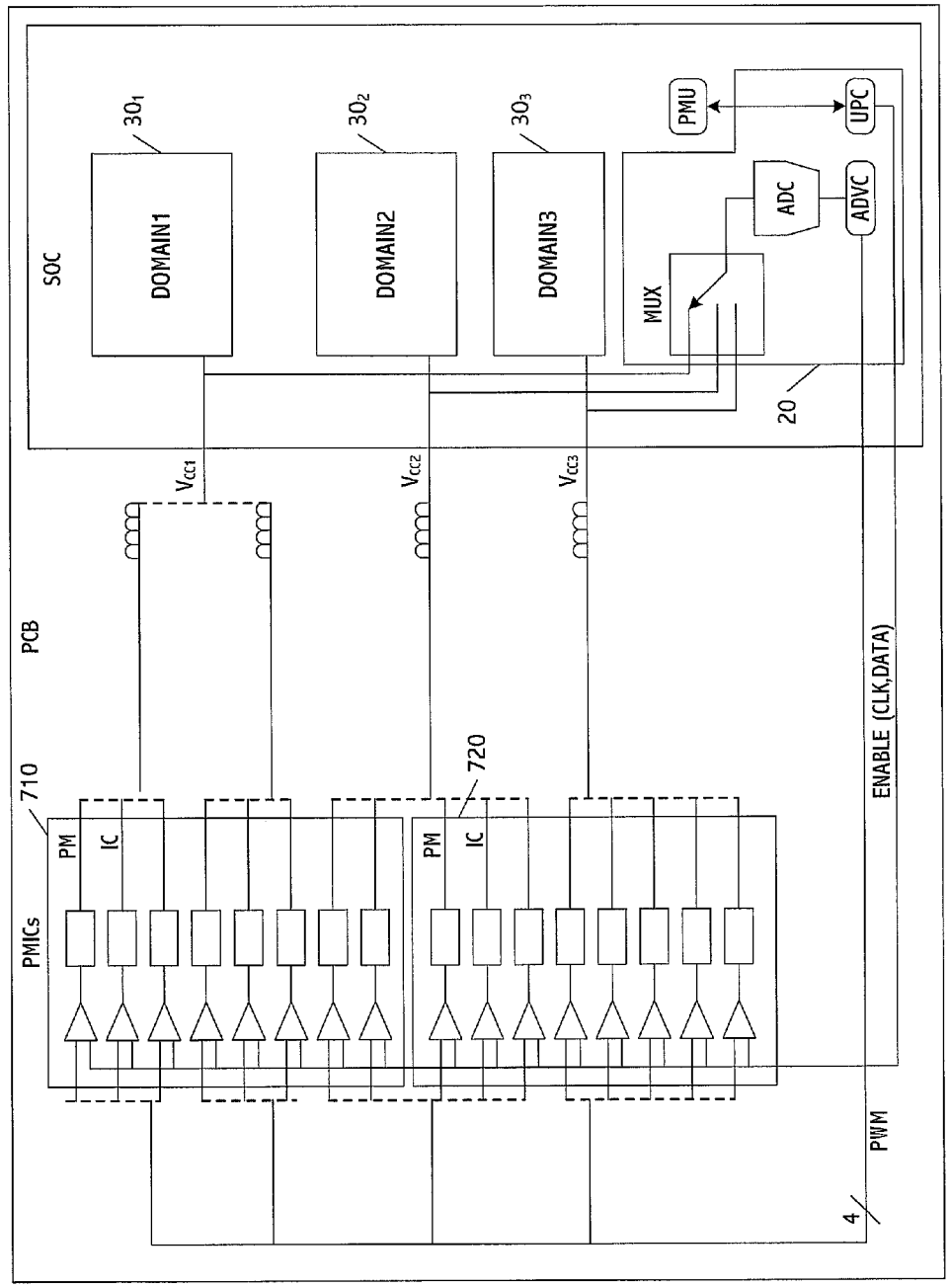
FIG. 7 shows another structure for the reconfigurable power manager.

FIG. 7 shows another embodiment of the reconfigurable power manager. This embodiment is similar to the previous embodiment, except that at least one power signal is generated based on power signals (Vcc1, Vcc2, and Vcc3) output from a plurality of power stages and the power stages are distributed over two chips 710 and 720. This embodiment may apply when the total current required for output by the power manager (e.g., the aggregate maximum required current levels of the power rails) exceeds the capacity of a single power manager chip.

For example, when the aggregate output of each power manager chip is 4 amps (with each driver outputting power at 500 mA), then two or more power manager chips may be grouped together to form higher current rails. Multi-phase voltage regulators (i.e., multiple VR controllers equal in number to the number of power manager chips and each outputting separate setting (e.g., PWM) signals) may also be provided to generate the power signals from the grouped power manager chips, in order to meet the requirements of the power domains.

As shown in FIG. 7, an output pin of the chip 720 may be coupled to an input pin of chip 710 to transfer enable signals between the chips. Because of the larger aggregate number of inputs of the two chips, the setting signal may corresponding to a PWM signal having a greater number of bits, for example, 4 bits as opposed to 3 bits included in the one-chip embodiments previously discussed.

This embodiment may be applied, for example, in the case where Vcc1 is rated for 3 amps, and is a two-phase design, and Vcc2 and Vcc3 are each 2.5 amps. In order to create the two phase voltage output, separate setting (e.g., PWM) signals may be used to control each phase. In this example, therefore, controller 20 may output 4 setting (PWM) signals including two signals for controlling the varying phases of the Vcc1 rail, one signal for setting the power signal over the Vcc2 rail, and one signal for setting the power signal over the Vcc3 rail. One or more VR controllers may be used to generate these setting signals.

In FIG. 7, the power manager chips are shown has having the same number of power stages, e.g., the same number of drivers coupled to the same number of FETs respectively. In other embodiments, the power manager chips may have different numbers of power stages, e.g., one chip may have eight power stages rated at 300 mA each and the other chip may have twenty power stages at 500 mA each or a different rated current.

In the aforementioned embodiments, circuitry may be included to sense the current on one or more of the power rails and/or the amount of power consumed by each rail. Another analog-to-digital converter may be added to convert the output of the current sensing circuitry for input into the VR controller or the power management unit (PMU). Also, the digital versions of the voltage and current provided by the analog-to-digital converters, respectively, can be provided to inform the PMU of the power consumption status of the rails. Setting signals may then be generated and output from the VR controller to adjust the power from the power manager accordingly. The currently sensing circuitry may be included in controller 20 or at an off-chip location.

In any of the aforementioned embodiments, the power rails coupled between the power manager and power domains may be single-phase rails or multi-phase rails Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with features of one or more other embodiments described herein to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An apparatus comprising:
    a selector circuit to select a first power signal from a plurality of power signals to be supplied to one or more power domains; and
    a controller to compare a level of the first power signal selected by the selector circuit to a first target level, and to generate a first setting signal to reduce a difference between the first power signal level and the first target level, wherein the controller, selector circuit, and one or more power domains are located on a same chip different from another chip which is to output the one or more power signals.

2. The apparatus of claim 1, wherein:
    the selector circuit is to select a second power signal to be supplied to a power domain different from the power domain corresponding to the first power signal, and
    the controller is to compare a level of the second power signal selected by the selector circuit to a second target level different from the first target level and is to generate a second setting signal to reduce a difference between the second power signal level and the second target level.

3. The apparatus of claim 2, further comprising:
    a circuit to generate a plurality of enable signals,
    wherein a first enable signal to enable adjustment of the first power signal by the first setting signal is to be generated independently from a second enable signal to enable adjustment of the second power signal by the second setting signal.

4. The apparatus of claim 2, wherein the controller is to receive from a memory information indicative of the first and second target levels for corresponding first and second power domains.

5. The apparatus of claim 4, wherein the memory is located on the same chip as the controller, selector circuit, and power domains.

6. The apparatus of claim 1, wherein the selector circuit includes a multiplexer.

7. The apparatus of claim 1, wherein the power domains correspond to different domains of power for a smart phone.

8. The apparatus of claim 1, further comprising:
    a converter circuit to convert the level of the first power signal to a digital value for comparison to the first target level by the controller.

9. The apparatus of claim 1, wherein at least one power domain is to be coupled to a plurality of output nodes of said another chip and wherein the first power signal is to be generated based on power signals output on said plurality of output nodes.

10. A method comprising:
    selecting a first power signal from a plurality of power signals for powering one or more power domains;
    comparing a level of a first power signal to a first target level, and
    generating a first setting signal to reduce a difference between the first power signal level and the first target level, wherein said selecting is performed by a selector circuit and said comparing and generating is performed by a controller, and wherein the controller, selector circuit, and one or more power domains are located on a same chip different from another chip which outputs the power signals.

11. The method of claim 10, further comprising:
selecting a second power signal to be supplied to a power domain different from the power domain corresponding to the first power signal,
comparing a level of the second power signal to a second target level different from the first target level; and
generating a second setting signal to reduce a difference between the second power signal level and the second target level.

12. The method of claim 11, further comprising:
generating a plurality of enable signals,
wherein a first enable signal to enable adjustment of the first power signal by the first setting signal is to be generated independently from a second enable signal to enable adjustment of the second power signal by the second setting signal.

13. The method of claim 11, further comprising:
receiving information indicative of the first and second target levels stored in a memory, wherein the first and second target levels correspond to first and second power domains respectively.

14. The method of claim 13, wherein the memory is located on the same chip as the controller, selector circuit, and power domains.

15. The method of claim 10, wherein the power domains correspond to different domains of power for a smart phone.

16. The method of claim 10, wherein at least one power domain is coupled to a plurality of nodes of said another chip and wherein the first power signal is generated based on power signals output on said plurality of nodes.

17. An apparatus comprising:
a first stage that is to generate a first power signal; and
a second stage that is to generate a second power signal, wherein:
the first and second stages are located on a same chip,
the first stage is to receive a first setting signal through a first node of the chip,
the second stage is to receive a second setting signal through a second node of the chip, and
the first stage is to receive the first setting signal independently from the second setting signal received by the second stage, each of the first and second power signals to be changed to different levels based on corresponding ones of the first and second setting signals.

18. The apparatus of claim 17, wherein:
the first setting signal is to set the first power signal to correspond to a first domain, and
the second setting signal is to set the second power signal to correspond to a second domain different from the first domain, the first and second power signals to be generated independently from one another.

19. The apparatus of claim 18, wherein the first power signal is to be output through a third node and the second power signal to be output through a fourth node of the chip.

20. The apparatus of claim 17, further comprising:
a third stage to generate a third power signal; and
a fourth stage to generate a fourth power signal,
wherein the third and fourth power signals are to be combined to form a fifth power signal.

21. The apparatus of claim 20, wherein the fifth power signal is output through one node of the chip.

22. The apparatus of claim 17, wherein each of the first and second power setting signals is a pulse width modulated signal.

* * * * *